US007693849B2

(12) United States Patent
Hess

(10) Patent No.: US 7,693,849 B2
(45) Date of Patent: Apr. 6, 2010

(54) MASKING OBJECT DATA BASED ON USER AUTHORIZATION

(75) Inventor: Howard M. Hess, Winnetka, IL (US)

(73) Assignee: International Business Machines Corporation, Armonk, NY (US)

(*) Notice: Subject to any disclaimer, the term of this patent is extended or adjusted under 35 U.S.C. 154(b) by 349 days.

(21) Appl. No.: 11/134,651

(22) Filed: May 19, 2005

(65) Prior Publication Data
US 2006/0265375 A1 Nov. 23, 2006

(51) Int. Cl.
G06F 7/00 (2006.01)
G06F 17/00 (2006.01)
G06F 15/16 (2006.01)
(52) U.S. Cl. ............................ 707/100; 707/102
(58) Field of Classification Search ............ 707/1–10, 707/100–102; 705/2, 35, 36, 36 R; 713/165; 711/167; 709/205; 717/125–172
See application file for complete search history.

(56) References Cited

U.S. PATENT DOCUMENTS

| 5,335,341 | A | * | 8/1994 | Chana | 714/37 |
| 5,748,774 | A | | 5/1998 | Levy et al. | |
| 5,875,484 | A | * | 2/1999 | Neuhard et al. | 711/167 |
| 6,275,824 | B1 | * | 8/2001 | O'Flaherty et al. | 707/9 |
| 6,732,148 | B1 | * | 5/2004 | Estrada et al. | 709/205 |
| 6,826,553 | B1 | * | 11/2004 | DaCosta et al. | 707/10 |
| 7,506,313 | B2 | * | 3/2009 | Bates et al. | 717/125 |
| 2002/0034187 | A1 | | 3/2002 | Kalkunte et al. | |
| 2002/0073309 | A1 | | 6/2002 | Kum et al. | |
| 2002/0194100 | A1 | * | 12/2002 | Choban et al. | 705/36 |
| 2003/0014394 | A1 | * | 1/2003 | Fujiwara et al. | 707/3 |
| 2003/0084339 | A1 | | 5/2003 | Roginsky et al. | |
| 2004/0111613 | A1 | * | 6/2004 | Shen-Orr et al. | 713/165 |
| 2004/0139043 | A1 | * | 7/2004 | Lei et al. | 707/1 |
| 2004/0148298 | A1 | | 7/2004 | Terasawa | |
| 2006/0111936 | A1 | * | 5/2006 | Mahesh et al. | 705/2 |
| 2006/0149739 | A1 | * | 7/2006 | Myers | 707/9 |

FOREIGN PATENT DOCUMENTS

EP 0 538 860 4/1993

OTHER PUBLICATIONS

Hada, S. and M. Kudo, "XML Access Control Language: Provisional Authorization for XML Documents", [online], Oct. 16, 2000, retrieved from the Internet at <URL: http://web.archive.org/web/20010317094202/http://www.trl.ibm>.
Jaeger, T. and A. Prakash, "Requirements of Role-Based Access Control for Collaborative Systems", *Proceedings of the first ACM Workshop on Role-based Access Control*, 1996, pp. II-53-II-64.
Kudo, M. and S. Hada, "XML Access Control", [online], Oct. 24, 2000, retrieved from the Internet at <URL: http://web.archive.org/web/20010317095156/http://www.trl.ibm>.
Kudo, M. and S. Hada, "XML Document Security based on Provisional Authorization", *Proceedings from the 7th ACM Conference on Computer and Communications Security*, 2000, pp. 87-96.

* cited by examiner

*Primary Examiner*—Cam Y Truong
*Assistant Examiner*—Cecile Vo
(74) *Attorney, Agent, or Firm*—David Victor; Konrad Raynes & Victor LLP

(57) ABSTRACT

Provided are a method, system, and program for processing a request for an object from a user. Layout information for the requested object is accessed, wherein the layout information delineates fields in the object. A determination is made from access control information as to whether the user is authorized to access the fields indicated in the layout information. The data from the object in one field which the user is not authorized to access is masked. The fields from the object are generated into a formatted object formatted according to the layout information, wherein the masked data is presented unintelligible to the user.

17 Claims, 4 Drawing Sheets

MASKING OBJECT DATA BASED ON USER AUTHORIZATION

BACKGROUND OF THE INVENTION

1. Field of the Invention

The present invention relates to a method, system, and program for masking object data based on user authorization.

2. Description of the Related Art

Certain file utility programs enable users to access data sets generated by another application program, such as a database program, a custom program written in a language such as COBOL, or commercially-available packaged software. For instance, the International Business Machines Corp. ("IBM") File Manager program allows users to view, edit, modify, report on and work with data sets created by other programs, such as database applications. Such data utility programs access layout information from the application program that generated the data set to determine the definition of fields in the data set and how to format the raw data for presentation to the user.

With such data utility programs, there is a concern that users may be able to access sensitive information or view combinations of information whose aggregation forms sensitive information.

SUMMARY

Provided are a method, system, and program for processing a request for an object from a user. Layout information for the requested object is accessed, wherein the layout information delineates fields in the object. A determination is made from access control information as to whether the user is authorized to access the fields indicated in the layout information. The data from the object in one field which the user is not authorized to access is masked. The fields from the object are generated into a formatted object formatted according to the layout information, wherein the masked data is presented unintelligible to the user.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
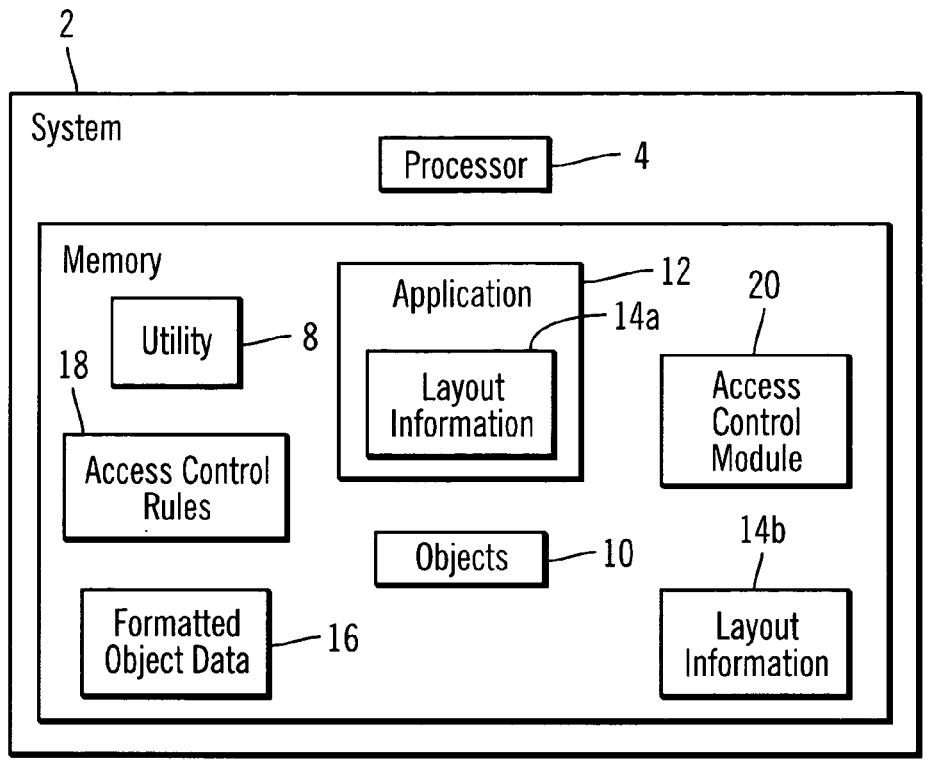
FIG. 1 illustrates an embodiment of a system network environment providing access to services.

FIG. 1 illustrates a computing system 2 including a processor 4 and memory 6 in which programs execute. The memory 6 includes a utility 8 application for accessing objects 10 generated by an application 12. For instance, the utility may comprise a file manager program that provides tools to work with data sets from different database programs so that the user may view, modify and otherwise access the data from the objects 10. In one embodiment, the objects 10 may not be self-describing, which means they do not include information enabling a user to format and view the data. For this reason, the utility 8 being used to access the data needs to access layout information 14a maintained for the object type by the application 12 to delineate the fields and format the data in the object 10. The application 12 may comprise a program, such as a database program, that generates objects, such as tables and records.

The application 12 layout information 14a provides information on the location, i.e., byte and offset of fields in the object 10, as well as labels for the fields and data type and other formatting information for records and objects 10 generated by the application 12. The layout information 14a is externalized into layout information 14b which is accessible to the utility 8.

The layout information 14b may be specified by entries made into an editor program. In yet another embodiment, the layout information 14b may be generated automatically, in which tools analyze programming source code of application 12 (or repositories created by tools that analyze programming source code) to detect software that accesses and manipulates the data in object 10. The tools retrieve the layout information 14a defined within the source code of application 12, and then generate the layout information 14b. The layout information 14b may be modified as the layout information 14a in the application 12 is modified through changes to the application 12 source code.

To format the data in the accessed objects 10 for presentation to a user, the utility 8 accesses the layout information 14b, which provides information on the location, i.e., byte and offset of fields in the object 10, as well as labels for the fields and data type and other formatting information. The utility 8 uses the layout information 14b to format the data in the object 10 fields into formatted object data 16 to present to a user, where the formatted object data 16 may be in a format the user may readily understand. The access control rules 18 provide authorization rules indicating the fields in objects 10 the user may access, such that a user may access certain fields and not others, depending on their authorization level.

An access control module 20 comprises code used to apply the access control rules 18 to control user access to data fields the layout information 14a defines in the object 10 based upon the user authorization for the defined fields. The access control module 20 may comprise code that is called by the utility 8 and/or application 12, or may be integrated within the code of the utility 8 and application 12.

In one embodiment, the system 2 may comprise a server accessed by client users over a network, where the clients access objects 10 in a separate storage device, such as a storage subsystem.

Figure 2:
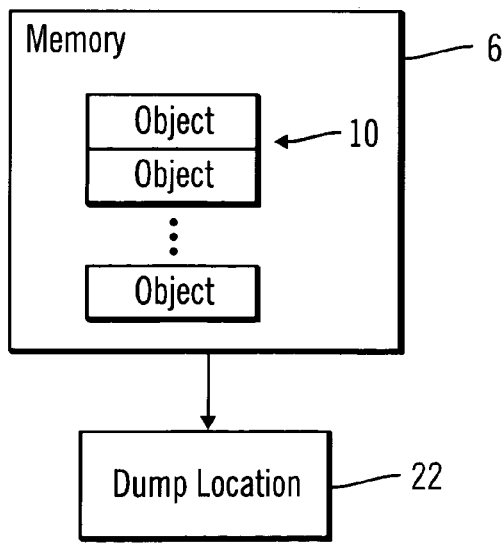
FIG. 2 illustrates an embodiment of a dump operation to copy objects to a dump location.

FIG. 2 illustrates the memory 6, such that the objects in memory 10 may be moved to a dump location 22 in the event that a crash of the application 12 or utility accessing the objects 10. The user may then access the objects in the dump location 20 when debugging the cause of the crash or recovering lost data. The dump location 22 may comprise a portion of the memory 6 or another storage device.

Figure 3:
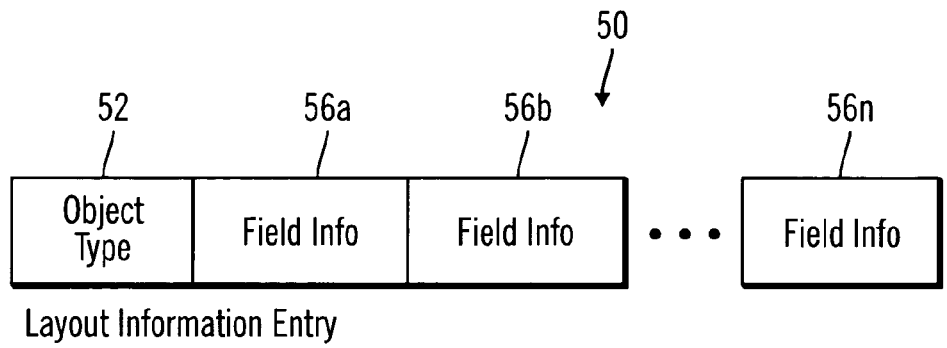
FIG. 3 illustrates an embodiment of layout information for an object.

FIG. 3 illustrates an embodiment of a layout information entry 50 in the layout information 14b providing layout information for one type of object 10. An entry 50 includes an object type field 52 indicating an object type identifier. A data set or other instance of object 10 may contain instances of one or more object type 52. Each layout information entry 50 may have one or more fields defined by field information 56a . . . 56n. Since there may be different types of objects 10 generated by the application 12 having different formats, the object type 52 identifies the particular type or format of object.

Figure 4:
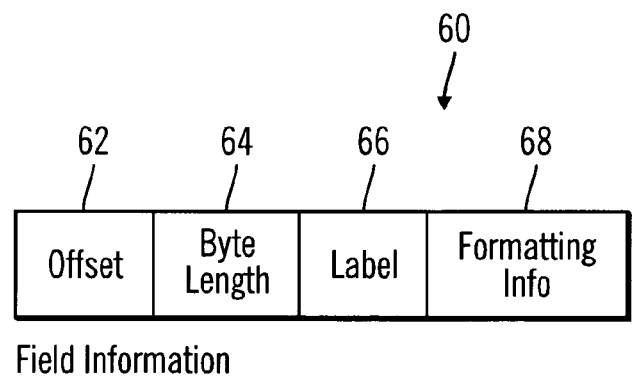
FIG. 4 illustrates an embodiment of field information within the layout information.

FIG. 4 illustrates an embodiment of information in the field information 56a . . . 56bn for one field, including an offset 62 of the byte in the object 10 at which the field begins; a byte length 64 indicating the length of the field; a label 66 providing a name or other identifier of the field; and formatting information 68 indicating how the data in the field is formatted for presentation to a user in the formatted object data 16, such as number of decimal places for a numeric character, font, type size, etc. When generating the object data into the formatted object data 16, the field may be displayed with the label 66 of the field. In yet another embodiment of field information 60, the offset 62 or length 64 for a field may be effected by the contents of a different field, e.g. the numeric value for field 56a may specify the length of the content of field 56b.

Figure 5:
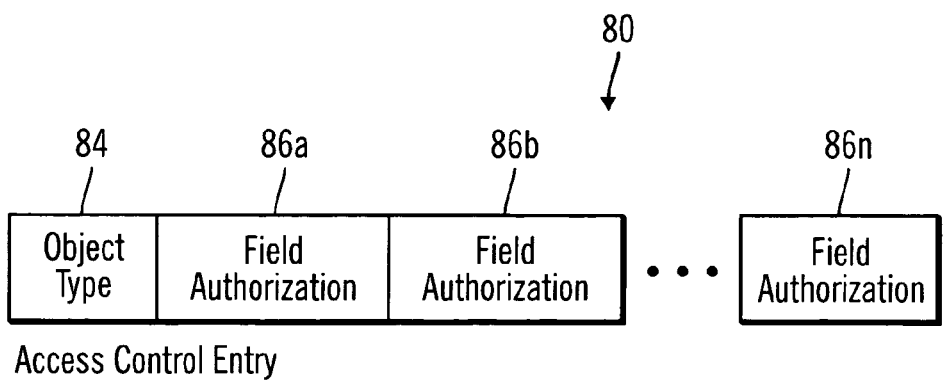
FIG. 5 illustrates access control information for a user.

FIG. 5 illustrates an embodiment of access control information 80 for one object type 84 indicating the user authorization to data for the fields of an object type, including: an object type 84 identifying the specific object format or data type for which there is one layout information entry 50 providing the format of the object; and field authorizations 86a . . . 86n providing an authorization for the user for a specific field. Thus, the field authorizations 86a . . . 86n identify one or more fields in the layout and the access rules for such fields. In one embodiment, the field authorizations 86a . . . 86n are only provided for those fields 56a . . . 56n in the layout information 50 for which authorization is required. For those fields 56a . . . 56n not requiring access authorization, there would be no field authorization entry 86a . . . 86n in the access control entry 80. Thus, there may be fewer field authorizations 86a . . . 86n than the number of actual fields 56a . . . 56n in the object 10. Alternatively, a field authorization 8a6a . . . 86n may be provided for every field in the layout. Further, there may be one field authorization providing the user authorization for multiple data fields in the object 10 as identified by the field information 56a . . . 56n. In one embodiment, the object type 52 in layout information entry 50 associates the particular layout information entry 50 with one access control entry 80 whose object type 84 matches the object type 52 of the layout information entry 50.

Figure 6:
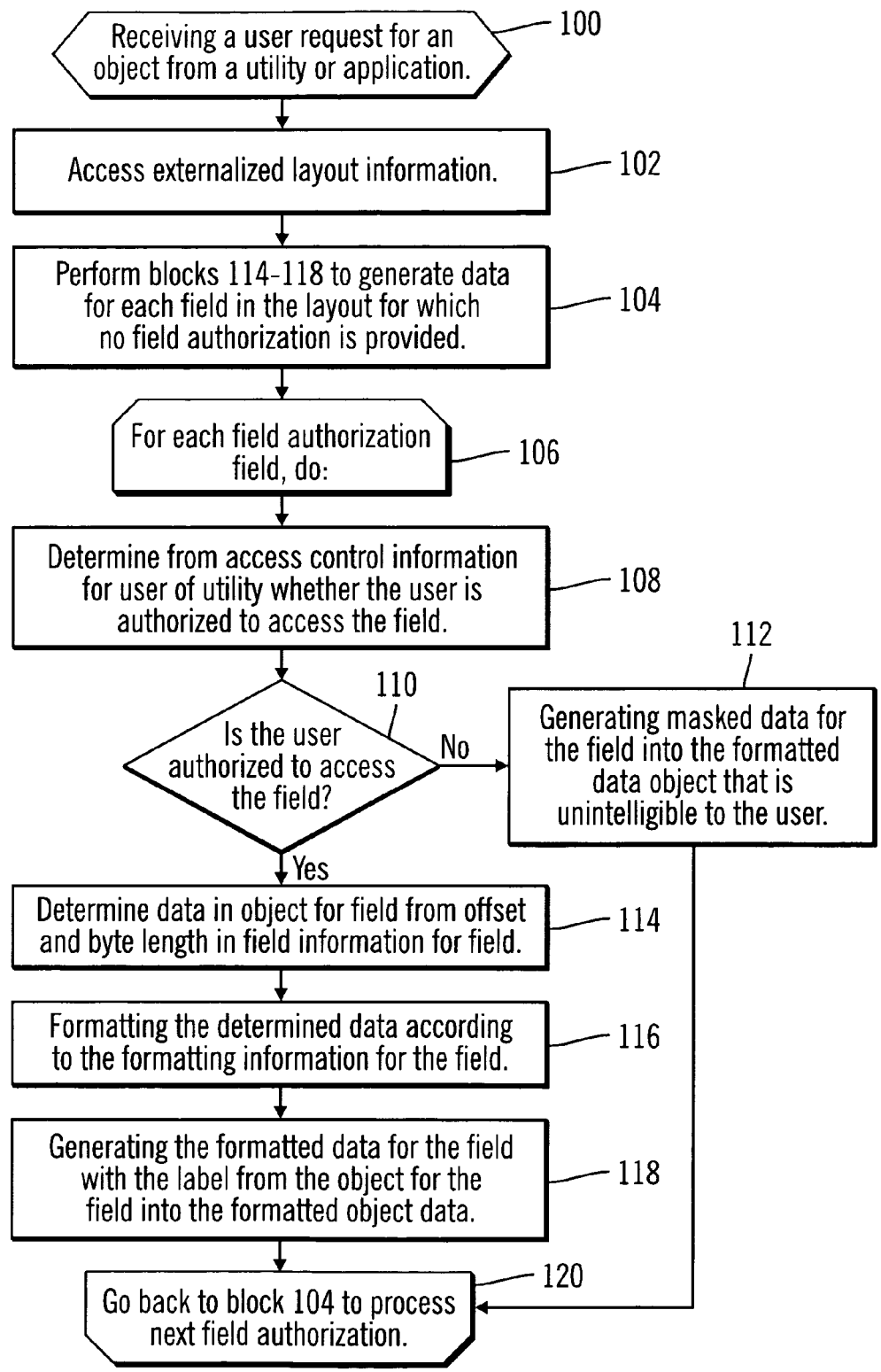
FIG. 6 illustrates an embodiment of operations to mask fields when providing access to an object.

FIG. 6 illustrates operations performed by the access control module 20 when the utility 8 or application 12 seeks to access data in an object 10 to present to the user. In response to receiving (at block 100) a user request for an object 10 from the utility 8 or application 12, the access control module 20 accesses (at block 102) the externalized layout information 14b for the object type 52 and the access control entry 80 for object type 84. For each field 56a . . . 56n in the layout information 50 for which no field authorization is provided in access control entry 80, i.e., there is no access restriction, the operations at blocks 114-118 are performed (at block 104) to generate data for those unrestricted fields into the formatted object data 16. For each field authorization field 86a . . . 86n for which access control rules are provided in the access control entry 80 for the object type 84, the operations at blocks 108 through 118 are performed to determine whether to output the data to the user in the formatted object data 16 for the user to observe. At block 108, the access control module 20 determines from the field authorization 86a . . . 86n in the user access control information 80 for the user and object type 84 whether the user is authorized to access the field associated with the field authorization 86a . . . 86n.

If (at block 110) the user is not authorized to access the field, then the access control module 20 generates (at block 112) masked data for the field into the formatted object data 16 that hides the field's data from the user. The masked data may comprise a blank field, a predefined string of characters that do not have intelligible meaning, such as all Xs, etc. Alternatively, the masked data may comprise an encoding of the actual data in the field of the object 10. Otherwise, if (at block 110) the user is authorized to access the data in the field, then the data in the object 10 for the field is determined (at block 114) from the offset 62 and byte length 64 indicated in the field information 60 for the field being processed. The determined data is formatted (at block 116) according to the formatting information 68 for the field. The formatted data for the field is then generated (at block 118) with the label 66 from the object for the field into the formatted data object 16.

After performing the operations of FIG. 6 the user may then view the formatted object data 16, but not be able to view the actual data for fields whose data is replaced with masked data.

Figure 7:
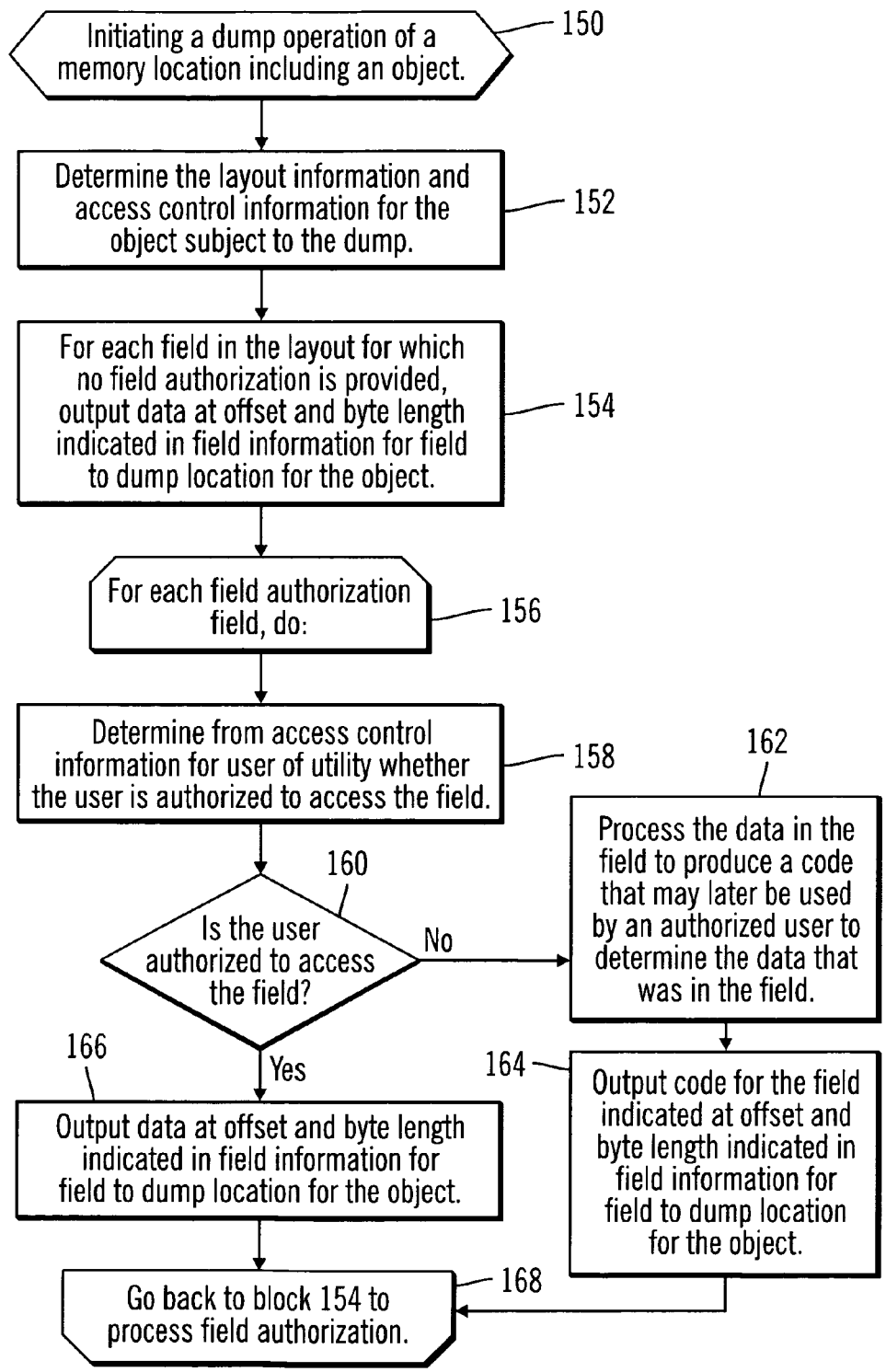
FIG. 7 illustrates an embodiment of operations to mask fields when performing a memory dump.

FIG. 7 illustrates operations performed by the access control module 20 when performing a memory dump to move the objects 10 from the memory 6 to the dump location 22 in a manner that masks certain object fields to which the user of the application 12 or utility 8 whose failure causes the dump does not have access. Upon initiating (at block 150) a dump operation of a memory 6 location including an object 10, the application 12, layout information entry 50, and access control information 80 for the object type subject to the dump is determined (at block 152). For each field in the layout for which no field authorization is provided, the access control module 20 outputs (at block 154) data at the offset and byte length indicated in field information 56a . . . 56b to the dump location 22 for the object. The access control module 20 performs (at blocks 156-166) the operations at blocks 158-164 for each field authorization field 86a . . . 86b providing access control rules. At block 158, the access control module 20 determines from the access control information 80 for the user of the utility or application accessing the object when the crash occurred, whether the user is authorized to access the field being considered. If the user is not authorized to access that field, then the data in the field being considered is processed (at block 162) to produce a code that may later be used by an authorized user to determine the data that was in the field. For instance, the code may be hashed or decoded to an index value addressing the data that was masked. In an alternative embodiment, the data in the field may be masked and replaced with unintelligible data. The generated code or masked data for the field is outputted (at block 164) to the dump location 22 for the object 10.

If (at block 160) the user is authorized to access the field being considered, then data at the offset 62 and byte length 64 in the object 10 defined in the field information 56a . . . 56n is outputted (at block 166) to the dump location 22 for the object 10. After outputting data for a field (at 162 or 164), control proceeds (at block 166) back to block 154.

With the operations of FIG. 7, before objects are moved to a dump location 22 as a result of a program crash, any data in fields to which the user of the program accessing the data when the crash occurred does not have access is masked from the user when moved to the dump location 22. This prevents the user from viewing in the dump location 22 data fields to which authorization is not permitted. However, in certain embodiments, data to which the user does not have access may be replaced by a code that may be used to access the masked data from the object 10.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a computer readable medium, where such medium may comprise hardware logic (e.g., an integrated circuit chip, Programmable Gate Array (PGA), Application Specific Integrated Circuit (ASIC), etc.) or a computer readable storage medium, such as magnetic storage medium (e.g., hard disk drives, floppy disks, tape), optical storage (CD-ROMs, optical disks), volatile and non-volatile memory devices (e.g., EEPROMs, ROMs, PROMs, RAMs, DRAMs, SRAMs, firmware). Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable storage medium at the receiving and transmitting stations or devices. Additionally, the "article 10 of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In additional embodiments, before performing the operations of FIGS. 6 and 7, if it is determined that an access control entry 80 is not provided for a specific object type 84 (FIG. 5) the user is attempting to access, then an exception may be raised and access to the object denied. If there is an access control entry 80 for the object type 84 subject to the access request, then the operations of FIGS. 6 and 7 are performed. This notifies the administrators of any objects for which access rules should be provided.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article or a different number of devices/articles may be used in place of the described more than one device or article.

The functionality and/or the features of a device may be alternatively embodied by one or more other devices which are not explicitly described as having such functionality/features. Thus, other embodiments of the present invention need not include the device itself.

The variable "n" indicates an integer number of instances of an element, and may take different values when used with different elements, such that 56$n$ and 86$n$ may indicate a same or different number of instances of the field information and field authorization, respectively.

The illustrated operations of FIGS. 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

processing an object in response to a user control of an application, wherein the object is maintained in a format that is not self-describing;

accessing, by using a computer, layout information for a requested object, wherein the layout information delineates fields in the object;

determining from access control information whether a user is authorized to access the fields indicated in the layout information;

in response to determining that the user is not authorized to access at least one of the fields, processing data in the at least one field which the user is not authorized to access to generate at least one code used to determine the data that was in the at least one field;

generating the fields from the object into a formatted object formatted according to the layout information;

generating data from the object in fields that the user is determined to have authority to access into the formatted object; and including the at least one code generated for the at least one field the user is not authorized access into the at least one field in the formatted object indicated in the layout information, wherein the data from the object for the at least one field for which the code is generated is not included in the formatted object, and wherein the at least one code included in the formatted object is enabled to be used by an authorized user subsequent to including the at least one code in the field in the formatted object to access from the object the data for the at least one field the user is not authorized to access.

2. The method of claim 1, wherein the layout information includes field information for each field, wherein generating the data from fields that the user is determined to have authority to access further comprises performing for each field indicated in the layout information:

determining data in the requested object for the field from the field information; and formatting the determined data according to the field information to present the data in the formatted field according to the layout information in response to determining that the user is authorized to access data in the field.

3. The method of claim 1, wherein the request for the data is made through a file utility.

4. The method of claim 1, wherein the access control information provides authorization access for different users for each field indicated in the layout information for the data.

5. The method of claim 1, wherein the code represents an index value addressing the data in the object the user is not authorized to access, and wherein the code is processed to determine the index value.

6. A method, comprising:

initiating a dump operation for an object in memory being accessed by a user invoked application in response to a failure effecting an application operation, wherein the object is maintained in a format that is not self-describing;

accessing, by using a computer, layout information for the object subject to the dump operation, wherein the layout information delineates fields in the object;

determining from access control information whether the user is authorized to access the fields indicated in the layout information;

in response to determining that the user is not authorized to access at least one of the fields, processing data in the at least one field which the user is not authorized to access to generate at least one code used to determine the data that was in the at least one field;

masking data from the object in the at least one field which the user is not authorized to access by adding the generated at least one code to the at least one field, wherein the at least one code is used to access from the object the data for the at least one field the user is not authorized to access;

generating the fields from the object into a formatted object formatted according to the layout information including any masked data for the at least one field of the object the user is not authorized to access, wherein the masked data is presented unintelligible to the user;

generating data from the object in fields that the user is determined to have authority to access into the formatted object; and outputting the formatted object to a dump location.

7. The method of claim 6, further comprising:

reviewing the data at the dump location; and using the code to determine from the object the data that was in the field.

8. A system, comprising:

a processor;

a computer readable storage medium including code executed to perform operations, the operations comprising:

an application;

an access control module that is executed to perform operations, the operations comprising:

processing an object in response to a user control of the application, wherein the object is maintained in a format that is not self-describing;

accessing layout information for a requested object, wherein the layout information delineates fields in the object;

determining from access control information whether a user is authorized to access the fields indicated in the layout information;

in response to determining that the user is not authorized to access at least one of the fields, processing data in the at least one field which the user is not authorized to access to generate at least one code used to determine the data that was in the at least one field;

generating the fields from the object into a formatted object formatted according to the layout information;

generating data from the object in fields that the user is determined to have authority to access into the formatted object; and including the at least one code generated for the at least one field the user is not authorized access into the at least one field in the formatted object indicated in the layout information, wherein the data from the object for the at least one field for which the at least one code is generated is not included in the formatted object, and wherein the at least one code included in the formatted object is enabled to be used by an authorized user subsequent to including the at least one code in the field in the formatted object to access from the object the data for the at least one field the user is not authorized to access.

9. The system of claim 8, wherein the layout information includes field information for each field, wherein generating the data from fields that the user is determined to have authority to access further comprises performing for each field indicated in the layout information:

determining data in the requested object for the field from the field information; and formatting the determined data according to the field information to present the data in the formatted field according to the layout information in response to determining that the user is authorized to access data in the field.

10. The system of claim 8, wherein the request for the data is made through a file utility.

11. The system of claim 8, wherein the access control information provides authorization access for different users for each field indicated in the layout information for the data.

12. The system of claim 8, wherein the code represents an index value addressing the data in the object the user is not authorized to access, and wherein the code is processed to determine the index value.

13. An article of manufacture comprising a computer readable storage medium including code executed by a processor to communicate with an application and cause operations to be performed, the operations comprising:

processing an object in response to a user control of the application, wherein the object is maintained in a format that is not self-describing;

accessing layout information for a requested object, wherein the layout information delineates fields in the object;

determining from access control information whether a user is authorized to access the fields indicated in the layout information;

in response to determining that the user is not authorized to access at least one of the fields, processing data in the at least one field which the user is not authorized to access to generate at least one code used to determine the data that was in the at least one field;

generating the fields from the object into a formatted object formatted according to the layout information;

generating data from the object in fields that the user is determined to have authority to access into the formatted object; and including the at least one code generated for the at least one field the user is not authorized access into the at least one field in the formatted object indicated in the layout information, wherein the data from the object for the at least one field for which the at least one code is generated is not included in the formatted object, and wherein the at least one code included in the formatted object is enabled to be used by an authorized user subsequent to including the at least one code in the field in the formatted object to access from the object the data for the at least one field the user is not authorized to access.

14. The article of manufacture of claim 13, wherein the layout information includes field information for each field, wherein generating the data from fields that the user is determined to have authority to access further comprises performing for each field indicated in the layout information:

determining data in the requested object for the field from the field information; and formatting the determined data according to the field information to present the data in the formatted field according to the layout information in response to determining that the user is authorized to access data in the field.

15. The article of manufacture of claim 13, wherein the request for the data is made through a file utility.

16. The article of manufacture of claim 13, wherein the access control information provides authorization access for different users for each field indicated in the layout information for the data.

17. The article of manufacture of claim 13, wherein the code represents an index value addressing the data in the object the user is not authorized to access, and wherein the code is processed to determine the index value.

\* \* \* \* \*